(12) United States Patent
DiSantis et al.

(10) Patent No.: US 12,736,935 B1
(45) Date of Patent: Sep. 15, 2026

(54) HIERARCHICAL TEMPORAL ONTOLOGY FOR INDUSTRIAL FACILITIES

(71) Applicant: Cerebre Co., Dallas, TX (US)

(72) Inventors: Joseph DiSantis, Houston, TX (US); Lewis Makin, Houston, TX (US); Robert Povey, Redmond, WA (US); Sam Korach, Broadview Heights, OH (US); Eléonore Dixon-Roche, Palm Beach Gardens, FL (US); Jeffrey Robbins, Needham, MA (US)

(73) Assignee: CEREBRE CO., Dallas, TX (US)

( * ) Notice: Subject to any disclaimer, the term of this patent is extended or adjusted under 35 U.S.C. 154(b) by 0 days.

(21) Appl. No.: 19/418,488

(22) Filed: Dec. 12, 2025

(51) Int. Cl.
*G05B 17/02* (2006.01)
*G06N 5/022* (2023.01)

(52) U.S. Cl.
CPC ............. *G05B 17/02* (2013.01); *G06N 5/022* (2013.01)

(58) Field of Classification Search
CPC ................................ G06N 5/022; G05B 17/02
See application file for complete search history.

(56) References Cited

U.S. PATENT DOCUMENTS

| | | | | |
|---|---|---|---|---|
| 9,218,427 B1 * | 12/2015 | Thompson, III | ........ | G06F 16/86 |
| 2025/0093864 A1 * | 3/2025 | Schoch | .................... | G06N 3/08 |

FOREIGN PATENT DOCUMENTS

| | | |
|---|---|---|
| CN | 119990316 A * | 5/2025 |

OTHER PUBLICATIONS

Huang, X., Yang, C., Zhang, Y., Lou, S., Kong, L., & Zhou, H. (2024). Ontology guided multi-level knowledge graph construction and its applications in blast furnace ironmaking process. Advanced Engineering Informatics, 62, 102927. (Year: 2024).*

Ren, H., Chen, Z., Liang, X., Yang, C., & Gui, W. (2022). Association hierarchical representation learning for plant-wide process monitoring by using multilevel knowledge graph. IEEE Transactions on Artificial Intelligence, 4(4), 636-649. (Year: 2022).*

* cited by examiner

*Primary Examiner* — Bijan Mapar
(74) *Attorney, Agent, or Firm* — Foley & Lardner LLP

(57) ABSTRACT

The present disclosure provides a computer-implemented method for constructing a hierarchical industrial knowledge ontology, comprising generating a multi-tier semantic graph model representing an industrial facility. The graph comprises an equipment components tier defining components that compose individual pieces of equipment, an equipment tier defining physical asset instances, an equipment-to-equipment connectivity tier defining physical connectivity relationships among the equipment, a flow tier defining directional transfer relationships for process or utility media, an equipment-to-function tier defining functional characteristics at the equipment or component level, a functional group tier defining nested functional subgraphs composed of multiple equipment and flow relationships, and an operating group tier defining outcome-driven subgraphs associated with specific operational objectives or modes. The ontology enables bidirectional semantic traversal across vertical, horizontal and semantic abstraction levels and relationship types to integrate context across tiers. The system maintains temporal layers preserving historical versions of each semantic tier, including transient state-conditioned groups, and supports reconstruction of prior plant states at specific timestamps for causal analysis of operational events.

28 Claims, 6 Drawing Sheets

HIERARCHICAL TEMPORAL ONTOLOGY FOR INDUSTRIAL FACILITIES

BACKGROUND

Industrial facilities such as refineries, chemical plants, power generation stations, and manufacturing complexes contain thousands of interconnected physical assets including pumps, heat exchangers, vessels, control valves, and instrumentation systems. These assets operate within complex process networks where equipment performance, operational constraints, and safety requirements create intricate interdependencies that span multiple levels of plant organization.

Traditional industrial information systems store plant data across disparate formats and databases. Engineering information resides in piping and instrumentation diagrams, equipment databases, and design specifications. Process knowledge is captured in operating procedures, control narratives, and functional specifications. Operational data exists in distributed control systems, historian databases, alarm management systems, and maintenance records. However, these systems store data without preserving the semantic meaning of how assets interrelate, how their roles change over time, or how operational objectives influence plant behavior. As a result, they provide information but not durable, computable knowledge of plant structure and operation. This fragmented approach creates significant barriers to comprehensive plant understanding and limits the effectiveness of modern analytical and decision support technologies.

Existing asset management systems typically represent equipment hierarchies at single levels of abstraction, focusing on either physical composition or functional relationships but not both simultaneously. These systems lack unified representations that capture the layered relationships between equipment components, asset connectivity, process flows, functional behavior, and operational objectives within a coherent data structure. The absence of integrated, multi-tier modeling prevents systems from representing the simultaneous physical, functional, and operational abstractions that domain experts rely on. Without such layered semantics, cross-domain reasoning cannot occur, and system-level analysis remains limited to isolated views rather than unified operational understanding.

Current industrial ontologies and knowledge representation approaches face challenges in maintaining semantic consistency as plant configurations evolve over time. Existing tools may track raw data changes, but they cannot maintain the evolution of semantic relationships themselves, such as changes in flow direction, reclassification of equipment function, or restructuring of operating objectives. As plant configurations evolve, current systems lack mechanisms to reconcile conflicting interpretations, resolve source inconsistencies, or preserve the chain of trust required for reliable reasoning. Equipment modifications, process changes, and operational updates occur frequently in industrial environments, but existing systems lack robust mechanisms to preserve the integrity of complex relationship models during these changes. The absence of governed update processes creates risks of semantic drift and reduces confidence in using these models for operational decision support.

Industrial facilities also lack comprehensive temporal modeling capabilities that preserve historical context of plant configurations and operational states. While some systems maintain timestamped process values, they do not capture temporally versioned semantic structures such as equipment-to-function mappings, flow topologies, or operating group memberships. Without preserved semantic versions, it is not possible to reconstruct the plant's historical configuration, analyze how structural changes contributed to operational events, or perform causal reasoning tied to past system states, operational events, or performance variations.

The complexity of modern industrial operations creates a growing need for intelligent systems that can reason across multiple dimensions of plant knowledge simultaneously. These systems require access to integrated knowledge representations that model physical structure, functional behavior, operational constraints, and temporal evolution within unified semantic frameworks. Existing ontologies lack governed update pathways that combine automated inference with expert validation to ensure semantic consistency. The absence of such comprehensive knowledge representations limits the effectiveness of artificial intelligence applications in industrial settings, drives the degradation of models as plants change, and constrains the development of advanced operational support capabilities.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

The present disclosure describes a hierarchical industrial knowledge ontology that organizes an entire facility into layered graph tiers including equipment subcomponents, equipment assets, equipment-to-equipment connectivity, flow relationships, equipment-to-function characteristics, functional groups, and operating groups. In some embodiments the ontology further incorporates additional semantic tiers such as user-defined analytical groupings, transient state-conditioned assemblies, and governance metadata layers that capture interpretive or reliability attributes associated with plant knowledge. These tiers collectively form a unified physical, functional, and operational model that supports real-time search, reasoning, and operational decision assistance across multiple dimensions of plant behavior.

The ontology enables bidirectional semantic traversal both vertically across abstraction levels and horizontally across physical and operational relationship types and, in some embodiments, across temporal versions and governance-informed perspectives of the ontology. Such traversal may incorporate trust weighting or interpretive metadata derived from subject matter expert input, enabling context-resolved reasoning. This allows the system to generalize or specialize context, derive causal implications, and answer complex operational queries that require integrating multiple layers of plant understanding.

The ontology is maintained through a hybrid sustainment mechanism in which machine learning models propose candidate updates and subject matter experts validate or refine them. Accepted updates are merged into the graph with version tracking and traceable change history, and may incorporate conflict resolution rules, trust indicators, or source lineage attributes to maintain semantic coherence as the facility evolves. This ensures long-term integrity and safe evolution of the facility's semantic representation. In some embodiments, users may introduce custom semantic groupings or analytical structures that are incorporated into the ontology through the same governed sustainment process. The invention provides a structured foundation for future expansions addressing advanced operational intelligence.

In some embodiments, the ontology includes temporal layers that preserve semantic versions of each tier, including historical equipment-to-function mappings, prior flow topologies, and past operational or user-defined assemblies. These temporal representations allow the system to reconstruct the state of equipment, connectivity, flow paths, functional assemblies, and operating groups at specific points in time. A temporal query engine enables comparison of past and present states, supports causal analysis of changes that preceded operational events, and enables temporal traversal that traces how structural or functional relationships evolved leading up to an operational event.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

Figure 1:
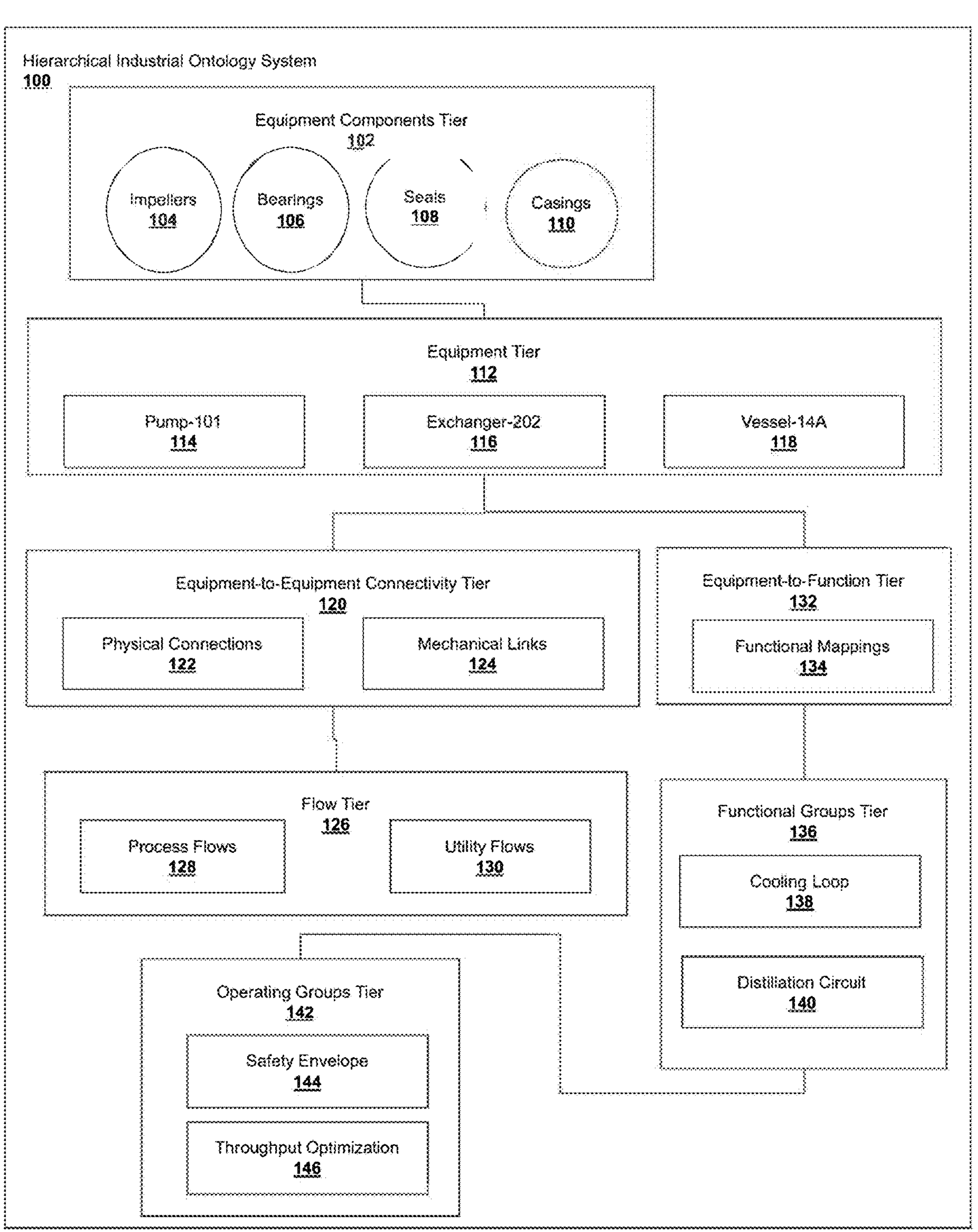
FIG. 1 illustrates a block diagram of a hierarchical industrial ontology system, according to aspects of the present disclosure.

Industrial facilities such as refineries, chemical plants, and manufacturing complexes contain thousands of interconnected assets. Each asset has unique design characteristics, operating constraints, instrumentation, and flow interactions. Conventional systems store this information in separate formats: piping diagrams, control logic, engineering databases, historian records, and maintenance systems. These isolated sources cannot support contextual reasoning, cross-discipline navigation, or AI-assisted decision support.

The hierarchical industrial knowledge ontology addresses these limitations by organizing an entire facility into layered graph tiers. This approach unifies physical plant structure and operational behavior within a single governed data model. The ontology includes nine distinct semantic layers: equipment subcomponents, equipment assets, equipment-to-equipment connectivity, flow relationships, equipment-to-function characteristics, functional groups, operating groups, user-defined outcome groupings, and transient operating group instantiation. These tiers form a multi-tier graph data model that represents both static engineering information and dynamic operational context.

The ontology provides bidirectional semantic traversal capabilities. Users can move vertically across abstraction levels or horizontally across physical and operational relationship types. Vertical traversal enables two types of movement: generalization from specific components to functional or operational contexts, and specialization from high-level groups to constituent assets and relationships. Horizontal traversal supports navigation across different relationship categories, such as following flow paths to identify affected equipment or expanding operating groups to functional assemblies that contribute to specific behaviors.

A hybrid sustainment mechanism maintains ontological integrity over time by combining machine learning inference with subject matter expert validation. Machine learning models analyze plant data to generate candidate updates, extensions, or modifications to the graph structure. Subject matter experts review these candidates through validation interfaces, where they can accept, reject, or refine proposed changes. The system merges accepted updates into the ontology with version tracking and traceable change history. This process preserves semantic correctness while enabling data-driven evolution of the facility's knowledge representation.

The ontology incorporates temporal semantic layers that preserve historical versions of each tier. This capability allows reconstruction of prior plant states and enables time-indexed reasoning about how structural or functional changes relate to operational events. The temporal functionality supports causal analysis by correlating connectivity changes, functional group modifications, or operating group transitions with subsequent alarms, performance deviations, or other operational outcomes.

The unified graph-based representation serves as a foundational substrate for AI-assisted operations, troubleshooting, optimization, and procedural guidance. The structured semantic model provides context-aware reasoning capabilities that integrate multiple layers of plant understanding. This integration enables complex operational queries that span physical connectivity, functional behavior, and operational objectives within a single coherent framework.

Referring to FIG. 1, a hierarchical industrial ontology system 100 organizes plant information through multiple interconnected tiers that represent different semantic layers of an industrial facility. The hierarchical industrial ontology system 100 provides a structured approach to capturing both granular physical details and high-level operational relationships within a unified graph-based data model.

At the foundation of the hierarchical industrial ontology system 100, an equipment components tier 102 represents the most granular physical elements that make up a piece of equipment. The equipment components tier 102 includes impellers 104, bearings 106, seals 108, and casings 110 as representative component types. In some cases, the equipment components tier 102 also includes motor windings, valve internals, exchanger shells, tube bundles, and tray sections as additional component types that extend the granular representation of equipment substructures. These components are modeled explicitly as graph nodes and form the leaf nodes of the physical composition tree, capturing the material-level structure of the plant. Component nodes may serve as endpoints for flow relationships and as carriers of functional assignments in higher tiers, allowing the ontology to represent behavior at the level of specific internal paths or surfaces when needed. In some embodiments, this tier also includes functionally significant subcomponents such as heat exchanger shell-side and tube-side paths, tray sections, pump suction and discharge stages, or other internal features whose distinct physical boundaries influence flow behavior or equipment function. This level provides the structural foundation for associating failure modes, degradation mechanisms, and component-level observations with higher tiers of plant behavior.

Above the equipment components tier 102, an equipment tier 112 captures the physical asset instances that are recognized and managed in operational and maintenance systems. As shown in FIG. 1, the equipment tier 112 includes specific equipment such as pump-101 114, exchanger-202 116, and vessel-14A 118. These equipment nodes carry identity information, nameplate data, design parameters, and connection points. The equipment tier 112 serves as primary anchors for linking maintenance records, inspection history, and engineering context to the broader ontological structure. By representing equipment as first-class entities above their constituent components, the ontology establishes the asset layer required for reasoning about operational performance, reliability profiles, and the structural relationships that connect equipment into larger functional assemblies.

With continued reference to FIG. 1, an equipment-to-equipment connectivity tier 120 establishes the topological structure of the plant by representing how equipment assets are connected across different physical and signal pathways. The equipment-to-equipment connectivity tier 120 comprises physical connections 122 and mechanical links 124 that capture various types of connectivity between equipment nodes. The equipment-to-equipment connectivity tier 120 captures the general concept of connection while also classifying the connection type, including mechanical, hydraulic linkage, electrical continuity, and instrumentation or control-signal relationships. These connections are typically derived from engineering artifacts such as Piping and Instrumentation Diagrams and establish undirected or bidirectional structural relationships that describe adjacency, containment, isolation, or simple connection. The ontology may reconcile connectivity information derived from multiple heterogeneous or inconsistent sources such as differing Piping and Instrumentation Diagrams, engineering databases, or field records, resolving discrepancies into a unified connectivity representation. By encoding both the presence and the category of connectivity, this tier provides the foundational topology on which flow semantics, functional behavior, and higher-order reasoning layers depend.

A flow tier 126 represents the directional transfer of media or signals between nodes in the graph and introduces the semantic distinction between process flow, utility flow, electrical power distribution, and instrumentation signal paths. As further shown in FIG. 1, the flow tier 126 includes process flows 128 and utility flows 130, distinguishing between process streams moving through unit operations and utility lines feeding devices. Each flow relationship is directional and typed, and may take one of four directional states: into a node, out of a node, bidirectional, or unknown when the available information is incomplete or contradictory. This allows the ontology to capture partially specified or ambiguous flow representations commonly found across engineering diagrams without forcing assumptions that may be incorrect. Flow relationships may connect equipment nodes, component nodes such as the shell or tube side of a heat exchanger, or a combination of both, enabling more precise modeling of internal flow topology where internal paths matter operationally. In some embodiments, flow relationships may express one of four directional states, including inflow, outflow, bidirectional flow, and unknown direction when available information is incomplete. By formalizing directionality, type, and uncertainty, this tier supports flow path tracing, isolation analysis, and operational reasoning even when the underlying data is incomplete.

An equipment-to-function tier 132 defines the semantic layer that separates what an asset is from what it does. The equipment-to-function tier 132 contains functional mappings 134 that capture functional behaviors, process roles, and design-intent characteristics associated with both whole pieces of equipment and their functional substructures. At the equipment level, this includes roles such as feed pumping, furnace preheating, or overhead condensation, allowing the ontology to distinguish a physical pump or exchanger from the process role it performs. The tier also assigns functions to component-level nodes, such as an exchanger shell, tube bundle, tray section, or pump suction stage, when those substructures have distinct thermal, hydraulic, or control behavior. These functional assignments can influence how flow is interpreted and how groups are formed in higher tiers. By modeling functions across both equipment and component granularity, this tier supports granular reasoning about process behavior, redundancy, subsystem operation, and the ways in which different parts of the plant contribute to higher-level functional assemblies.

A functional groups tier 136 introduces the first tier of higher-order aggregation within the ontology, as it organizes equipment and flow relationships into functional assemblies that reflect the unit operations or subsystem behaviors they collectively perform. As shown in FIG. 1, the functional groups tier 136 includes examples such as cooling loop 138 and distillation circuit 140. A functional group may represent a narrowly scoped assembly, such as an exchanger bank, or a broader subsystem such as a reflux system. To accommodate this variation in scope, the tier supports hierarchical nesting, allowing smaller functional units to roll up into larger assemblies when they contribute to shared process objectives. Group membership is determined by functional relationships rather than physical proximity, and each group captures the interactions that enable a specific thermodynamic or mechanical function. By permitting sublevels within this tier, the ontology can represent functional logic at multiple scales, from tightly coupled equipment clusters to higher-level unit operations, while maintaining a consistent semantic structure across the hierarchy.

At the highest structural level, an operating groups tier 142 captures outcome-driven groupings of assets and functions that share a common operational objective or constraint. The operating groups tier 142 includes safety envelope 144 and throughput optimization 146 as representative operational objectives. Unlike Functional Groups, which are rooted in process logic, Operating Groups are defined by intent. They may represent targets such as maintaining system pressure within limits, maximizing throughput, preserving a safety envelope, or managing energy balance. An asset is included in an Operating Group because its behavior contributes to that specific operational outcome, even if it is not physically adjacent to other members, and group activation or deactivation may alter which constraints, flows, or functional dependencies are relevant during analysis. This allows the ontology to model dynamic or transient relationships that exist only during particular operating modes, such as startup, shutdown, or emergency conditions, and supports reasoning aligned directly with real operational decision making.

The hierarchical industrial ontology system 100 provides mechanisms that allow users to define new groupings or conceptual structures directly within the graph. Through governed interfaces, users may create custom assemblies, analytical perspectives, or domain-specific categories that reflect local operating practices or specialized engineering knowledge. When a user introduces a new grouping, the system assigns it a formal node within the ontology, defines its relationship boundaries, and incorporates it into the semantic and temporal layers subject to integrity checks. These user-defined constructs may represent recurring analytical views, specialized diagnostic sets, or ad hoc collections relevant to a specific study or event investigation. By embedding these user-generated groupings into the ontology in a controlled and auditable manner, the system supports collaborative knowledge development and ensures that evolving plant expertise becomes part of the persistent semantic infrastructure rather than remaining isolated in individual workflows.

The hierarchical industrial ontology system 100 can dynamically create or activate specific Operating Group nodes based on real-time or historical operating conditions. When the facility enters a defined process state, such as startup, shutdown, heating phase, or emergency isolation, the system instantiates an Operating Group that links the assets and functions relevant in that state. These groups persist only while the associated conditions remain active and are archived when the plant transitions to a new mode, such as steady state or cooldown. Because group membership is defined by operational intent rather than physical adjacency, the instantiated groups represent transient relationships that exist only during specific process contexts. This dynamic behavior allows the ontology to serve as a state-dependent model of the facility, filtering out inactive constraints and enabling accurate reasoning about alarms, protective actions, and mode-specific process behavior. When transient operating groups are instantiated or archived, the event is recorded in the temporal layer as a discrete semantic transition. This enables later reconstruction of mode-specific contexts, such as identifying which transient groups were active during startup when an alarm occurred or determining how changes in mode membership influenced downstream process behavior.

In addition to the structural tiers, the ontology incorporates temporal layers that preserve historical versions of each semantic tier. These layers store time-indexed snapshots of equipment components, equipment assets, connectivity, flow relationships, functional groupings, and operating groups. Unlike simple timestamped data logs, the temporal layers maintain semantic structure, allowing the system to represent how the plant's configuration and operating intent evolved over time. Historical versions can be reconstructed on demand, enabling queries such as the configuration of a functional group on a prior date or the operating groups that were active when a particular alarm occurred. Temporal reasoning capabilities allow users and automated systems to identify changes to equipment connectivity, function, or group membership that preceded an operational event. By maintaining semantic coherence across time, the temporal layers support deep causal analysis and provide a foundation for state-dependent operational intelligence. For example, consider an alarm that occurred on September 27 at 03:14. A temporal query retrieves the exact semantic configuration active at that moment, including the flow direction across exchanger E-205, the membership of its associated cooling-loop functional group, and the transient operating group active during startup. This reconstructed state may differ materially from the current configuration due to subsequent equipment modifications or mode transitions. By comparing these two temporal states, the system reveals whether a connectivity change, function reassignment, or operating-group transition preceded the alarm event. This provides a concrete mechanism for causal analysis that cannot be performed with timestamped data alone.

The ontology introduces a governance-oriented traversal lens that manages how knowledge is accumulated, validated, and interpreted across the ontology. It captures governance metadata generated from user interactions, system inference, and external data sources, enabling the ontology to reflect not only plant structure but also the institutional understanding that surrounds it. The tier incorporates a chain-of-trust model that records the origin, reliability, and validation history of each assertion, allowing the system to identify and prioritize authoritative information when encountering contradictions or inconsistent data. Governance traversal makes this metadata navigable, enabling users and automated systems to evaluate competing interpretations, trace the rationale behind accepted relationships, and elevate perspectives with stronger validation or operational relevance. By embedding trust, source lineage, and conflict-resolution cues directly into the semantic structure, this tier ensures that the ontology evolves in a controlled, auditable manner and remains aligned with the most reliable understanding of plant behavior.

In some cases, the hierarchical industrial ontology system 100 is stored using various graph database implementations including distributed graph databases, in-memory graph databases, or hybrid storage approaches that combine persistent and volatile storage layers. The distributed graph architecture enables scale-out compute operations, while in-memory implementations provide enhanced query performance for real-time applications. Hybrid approaches may utilize persistent storage for historical data and in-memory caching for frequently accessed current state information. This distributed approach supports the large-scale data requirements and complex relationship structures that characterize comprehensive industrial facility representations, providing the computational foundation for real-time traversal and reasoning operations across the multi-tier ontological structure.

In one embodiment using a distributed graph database, each tier of the ontology is stored as a distinct node type with typed edges representing relationships between tiers. Equipment component nodes connect to equipment nodes through 'composes' edges. Equipment nodes connect to other equipment nodes through 'physically-connected-to' edges in the connectivity tier. Flow relationships are represented as directed edges with 'flows-to' types and attributes specifying media type and directionality. The distributed architecture partitions the graph across multiple compute nodes based on process unit boundaries, enabling parallel query execution for traversal operations that span multiple units.

Figure 2:
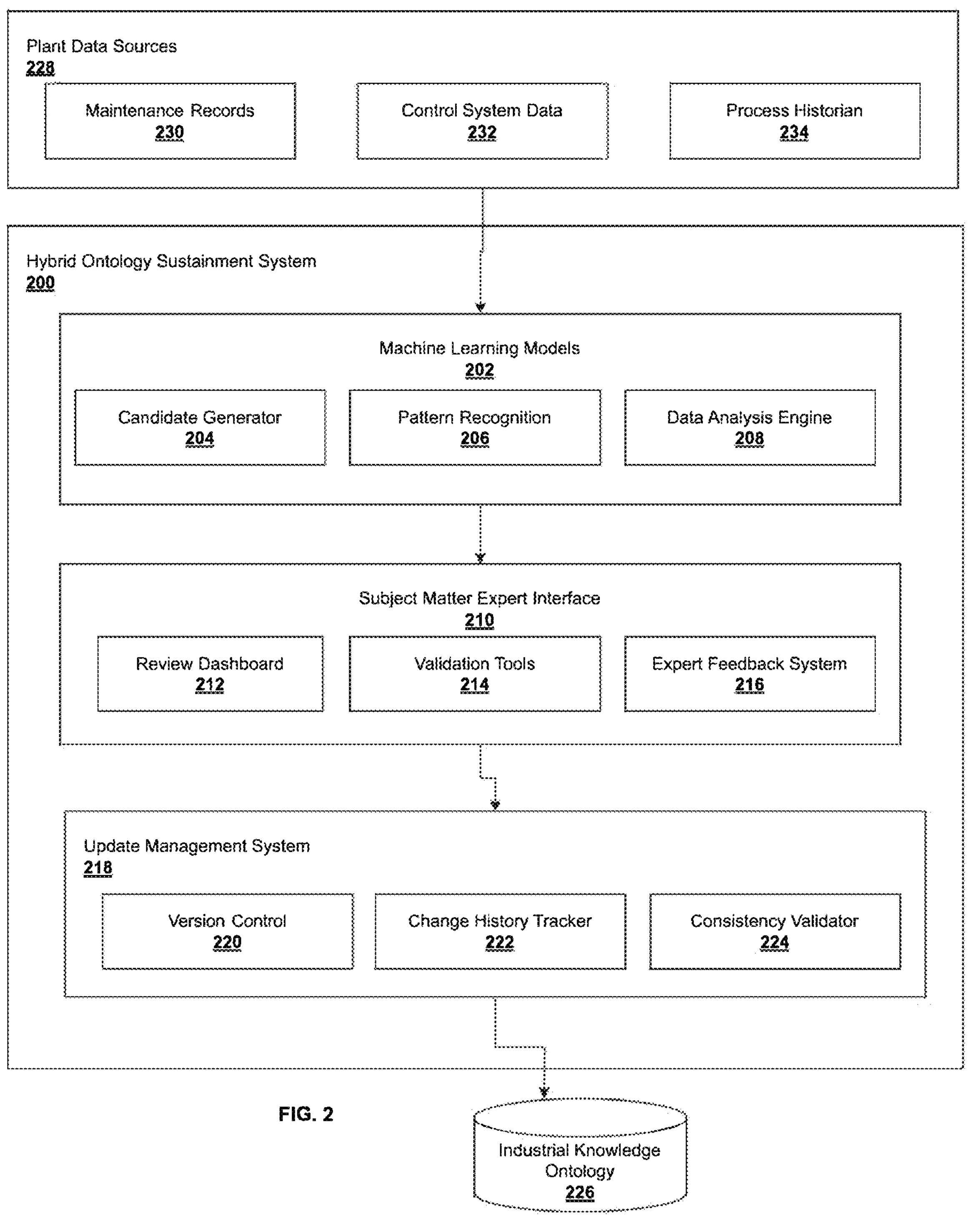
FIG. 2 illustrates a block diagram of a hybrid ontology sustainment system, according to aspects of the present disclosure.

Referring to FIG. 2, a hybrid ontology sustainment system 200 maintains and updates the hierarchical industrial knowledge ontology through a combination of automated analysis and expert validation. The hybrid ontology sustainment system 200 integrates machine learning capabilities with human expertise to preserve accuracy and semantic integrity of the ontological structure over time.

Plant data sources 228 provide input information from multiple industrial data repositories that feed the sustainment process. The plant data sources 228 comprise maintenance records 230, control system data 232, and process historian 234. These data sources supply raw information that captures equipment history, operational parameters, and process measurements from across the industrial facility. In some cases, the plant data sources 228 include reliability system data that provides additional context about equipment performance and degradation patterns.

The plant data sources 228 connect to machine learning models 202 that analyze incoming data to identify potential ontology updates. As shown in FIG. 2, the machine learning models 202 comprise a candidate generator 204, pattern recognition 206, and a data analysis engine 208. The candidate generator 204 creates proposed modifications or extensions to the ontology based on observed patterns in the plant data. Pattern recognition 206 identifies recurring relationships or behaviors that suggest new semantic connections or modifications to existing ontological structures. The data analysis engine 208 processes large volumes of information to extract semantic insights that inform candidate update generation. In alternative embodiments, the machine learning models 202 may include neural network architectures such as graph neural networks for relationship learning, transformer models for sequence analysis of temporal patterns, reinforcement learning agents for optimization of update strategies, or ensemble methods that combine multiple model types for enhanced accuracy and robustness. In one embodiment, a graph neural network analyzes historical maintenance records to identify equipment connectivity patterns. For example, when maintenance records indicate that Pump-101 and Valve-205 are frequently serviced together, and control system data shows correlated performance metrics, the graph neural network generates a candidate connectivity relationship between these assets. The candidate includes a confidence score based on the frequency of co-occurrence and the strength of performance correlation. This candidate is then presented to a subject matter expert through the review dashboard 212, along with supporting evidence including the maintenance record timestamps, performance metric correlations, and existing connectivity relationships in the vicinity of both assets.

In some cases, the machine learning models 202 are triggered to generate updates based on reliability system data in addition to the maintenance records 230, control system data 232, and process historian 234. This reliability system triggering enables proactive identification of ontological updates based on equipment performance trends, failure patterns, or degradation indicators that suggest changes to functional relationships or operational groupings.

With continued reference to FIG. 2, output from the machine learning models 202 flows into a subject matter expert interface 210 that provides tools for human reviewers to evaluate proposed changes. The subject matter expert interface 210 comprises a review dashboard 212, validation tools 214, and an expert feedback system 216. The review dashboard 212 presents candidate updates in an organized format for expert examination, allowing reviewers to assess proposed modifications within the context of existing ontological structures. Validation tools 214 provide mechanisms for testing and verifying proposed changes before incorporation into the ontology. The expert feedback system 216 captures reviewer decisions and rationale, creating a traceable record of validation outcomes. Alternative expert validation workflows may include automated validation for low-risk updates based on confidence thresholds, tiered review processes where simple updates require single expert approval while complex changes require consensus from multiple experts, or machine-assisted validation where AI systems pre-screen updates and flag only those requiring human attention.

Validated updates proceed to an update management system 218 that handles integration of accepted changes into the ontology while maintaining governance and traceability.

As further shown in FIG. 2, the update management system 218 comprises version control 220, a change history tracker 222, and a consistency validator 224. Version control 220 manages different versions of the ontology over time, enabling rollback capabilities and historical comparison of ontological states. The change history tracker 222 records all modifications along with timestamps, responsible parties, and reasoning for acceptance or rejection of updates. The consistency validator 224 ensures that new updates maintain semantic integrity and do not violate ontological constraints or introduce logical inconsistencies.

In some cases, the update management system 218 assigns trust metadata to accepted updates referencing source reliability, reviewer identity, and any conflicting interpretations that were resolved. This trust metadata assignment enhances update reliability by weighting proposed changes according to the credibility and accuracy history of their originating data sources or reviewing experts. Updates from highly reliable sources or validated by experts with strong track records receive higher trust scores, influencing prioritization and acceptance thresholds within the sustainment process. These governance attributes are stored in the temporal layer alongside structural changes, ensuring that every semantic evolution of the plant is accompanied by a transparent chain of trust that can be inspected or queried.

The update management system 218 applies incremental delta-merge processing for ontology updates. This delta-merge processing enables efficient integration of validated changes by identifying and applying only the specific modifications needed to incorporate new information, rather than rebuilding entire ontological structures. The incremental approach reduces computational overhead and minimizes disruption to ongoing ontological operations while maintaining consistency across the multi-tier graph structure.

An industrial knowledge ontology 226 represents the maintained graph structure that stores the hierarchical representation of the industrial facility. The industrial knowledge ontology 226 receives updates from the update management system 218 and serves as the authoritative semantic model of the plant. The industrial knowledge ontology 226 also provides feedback to the machine learning models 202, creating a closed-loop sustainment process where the current state of the ontology informs future candidate generation and pattern recognition activities. Alternative temporal storage strategies may include snapshot-based approaches that capture complete ontological states at regular intervals, delta-based storage that records only changes between versions, or hybrid approaches that combine periodic snapshots with incremental delta records for optimal storage efficiency and query performance.

Figure 3:
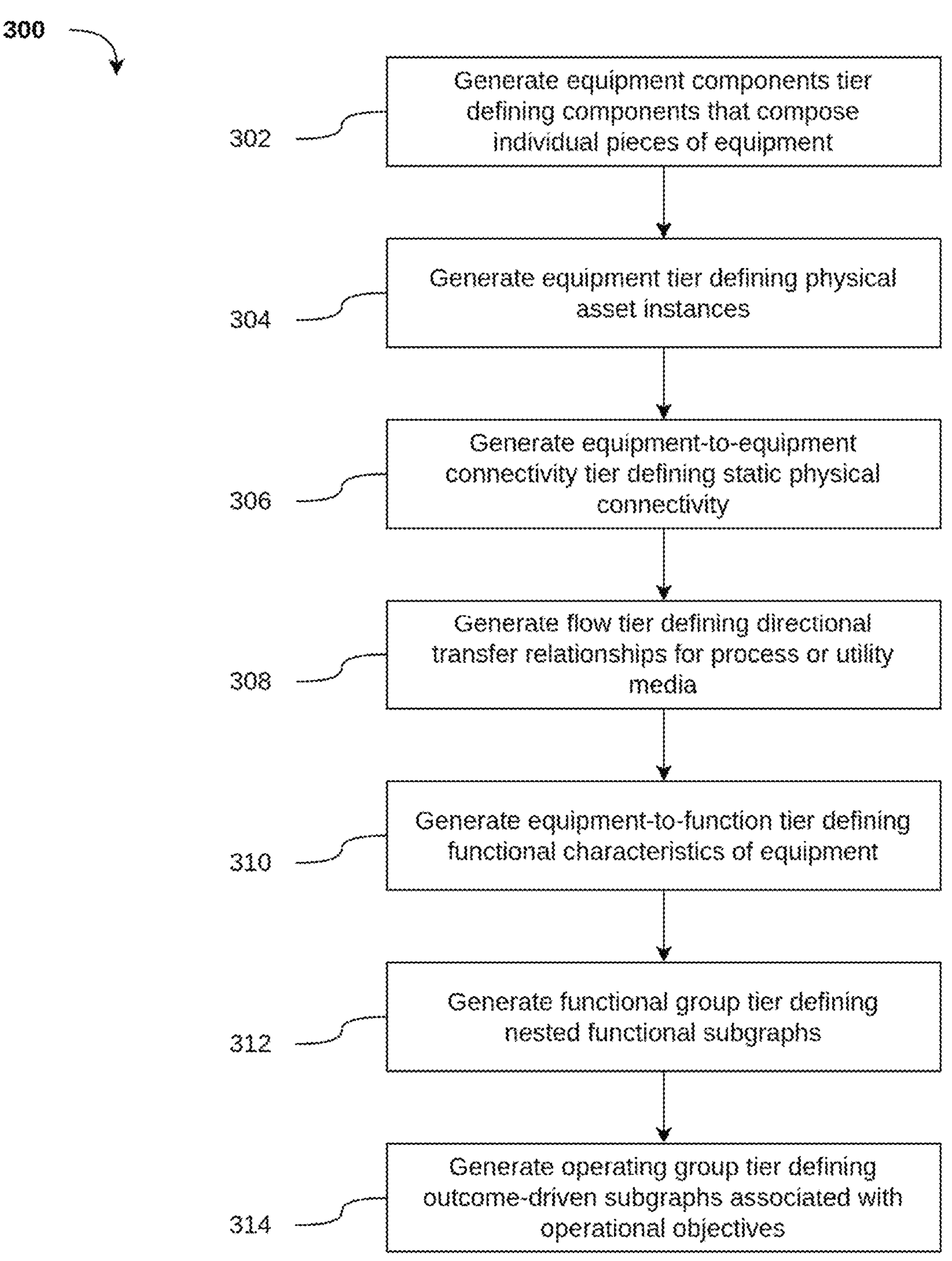
FIG. 3 illustrates a flowchart for a method for constructing a hierarchical industrial knowledge ontology, according to aspects of the present disclosure.

Referring to FIG. 3, a method 300 provides a systematic approach for constructing a hierarchical industrial knowledge ontology through sequential generation of multiple semantic tiers. The method 300 establishes a multi-tier graph data model representing an industrial facility by building each ontological layer in a structured sequence that creates comprehensive coverage of physical, functional, and operational plant relationships.

The method 300 begins with step 302, where the system generates an equipment components tier defining components that compose individual pieces of equipment. Step 302 establishes the foundational layer of the ontological structure by creating nodes for granular physical elements such as the impellers 104, bearings 106, seals 108, and casings 110 described in the equipment components tier 102. In some cases, step 302 also generates nodes for motor windings and valve internals as additional component types that extend the granular representation of equipment substructures. This equipment components tier forms the leaf nodes of the physical composition hierarchy and provides the material-level foundation for associating component-level observations with higher tiers of plant behavior.

The method 300 proceeds to step 304, which involves generating an equipment tier defining physical asset instances. Step 304 creates equipment nodes that represent the physical assets recognized and managed in operational and maintenance systems, building upon the component-level foundation established in step 302. The equipment tier generated in step 304 includes specific equipment instances that carry identity information, nameplate data, design parameters, and connection points, serving as primary anchors for linking maintenance records and engineering context to the broader ontological structure.

With continued reference to FIG. 3, the method 300 continues to step 306, where the system generates an equipment-to-equipment connectivity tier defining static physical connectivity among the equipment. Step 306 establishes the topological structure of the plant by creating relationships between the equipment nodes generated in step 304. In some cases, the equipment-to-equipment connectivity tier is generated at least in part from piping and instrumentation diagrams, providing engineering-based validation of the connectivity relationships. The connectivity tier generated in step 306 captures mechanical, hydraulic, electrical, and signal connections that define how equipment assets are physically linked within the facility.

The method 300 advances to step 308, which generates a flow tier defining directional transfer relationships for process or utility media. Step 308 builds upon the static connectivity established in step 306 by introducing directed transfer relationships that describe how media move between equipment nodes. The flow tier generated in step 308 specifies directionality of material, energy, or signal transfer between equipment, enabling flow path tracing and operational reasoning. In some cases, the flow tier distinguishes process media flows from utility media flows, providing differentiated representation of process streams versus utility lines within the facility.

As further shown in FIG. 3, the method 300 proceeds to step 310, where the system generates an equipment-to-function tier defining functional characteristics of equipment. Step 310 creates semantic connections between the physical assets established in step 304 and their operational roles within the process. The equipment-to-function tier generated in step 310 associates equipment with functions such as fluid displacement, thermal transfer, or separation, enabling analysis based on functional identity rather than physical similarity.

The method 300 continues to step 312, which involves generating a functional group tier defining nested functional subgraphs composed of multiple equipment and flow relationships. Step 312 creates assemblies that combine the equipment nodes from step 304 and flow relationships from step 308 into coherent functional units. The functional group tier generated in step 312 represents cooling loops, distillation circuits, or reflux systems as examples of multi-equipment process functions. In some cases, the functional group tier comprises nested functional groups representing hierarchical unit operations, enabling multiple levels of functional abstraction within the ontological structure.

The method 300 concludes with step 314, where the system generates an operating group tier defining outcome-driven subgraphs associated with operational objectives. Step 314 creates the highest-level semantic layer by establishing groupings based on operational intent rather than physical or functional similarity. The operating group tier generated in step 314 represents operational objectives including throughput maximization, safety envelope maintenance, or energy efficiency optimization, capturing outcome-driven relationships that span multiple functional groups and equipment assets.

The sequential construction approach of the method 300 enables each tier to build upon the semantic foundation established by previous steps, creating a comprehensive multi-tier graph data model that integrates physical structure, functional behavior, and operational objectives. In some cases, the method 300 further comprises applying ontology integrity rules that restrict modifications violating physical or operational constraints, ensuring semantic consistency across the multi-tier structure. The method 300 also comprises performing dependency revalidation when a graph update affects related equipment, flow, or function nodes, maintaining relational integrity as the ontological structure evolves.

In some cases, the multi-tier graph data model generated by the method 300 is stored using various graph database implementations including distributed graph databases for scalability, in-memory graph databases for performance, or hybrid storage approaches that optimize for both capacity and speed. Alternative traversal algorithms may include breadth-first search for comprehensive relationship discovery, depth-first search for targeted path analysis, or specialized graph algorithms such as shortest path algorithms for optimization queries. The distributed storage approach supports the computational requirements for traversal and reasoning operations across the complete ontological structure created through the sequential tier generation process of steps 302 through 314.

Figure 4:
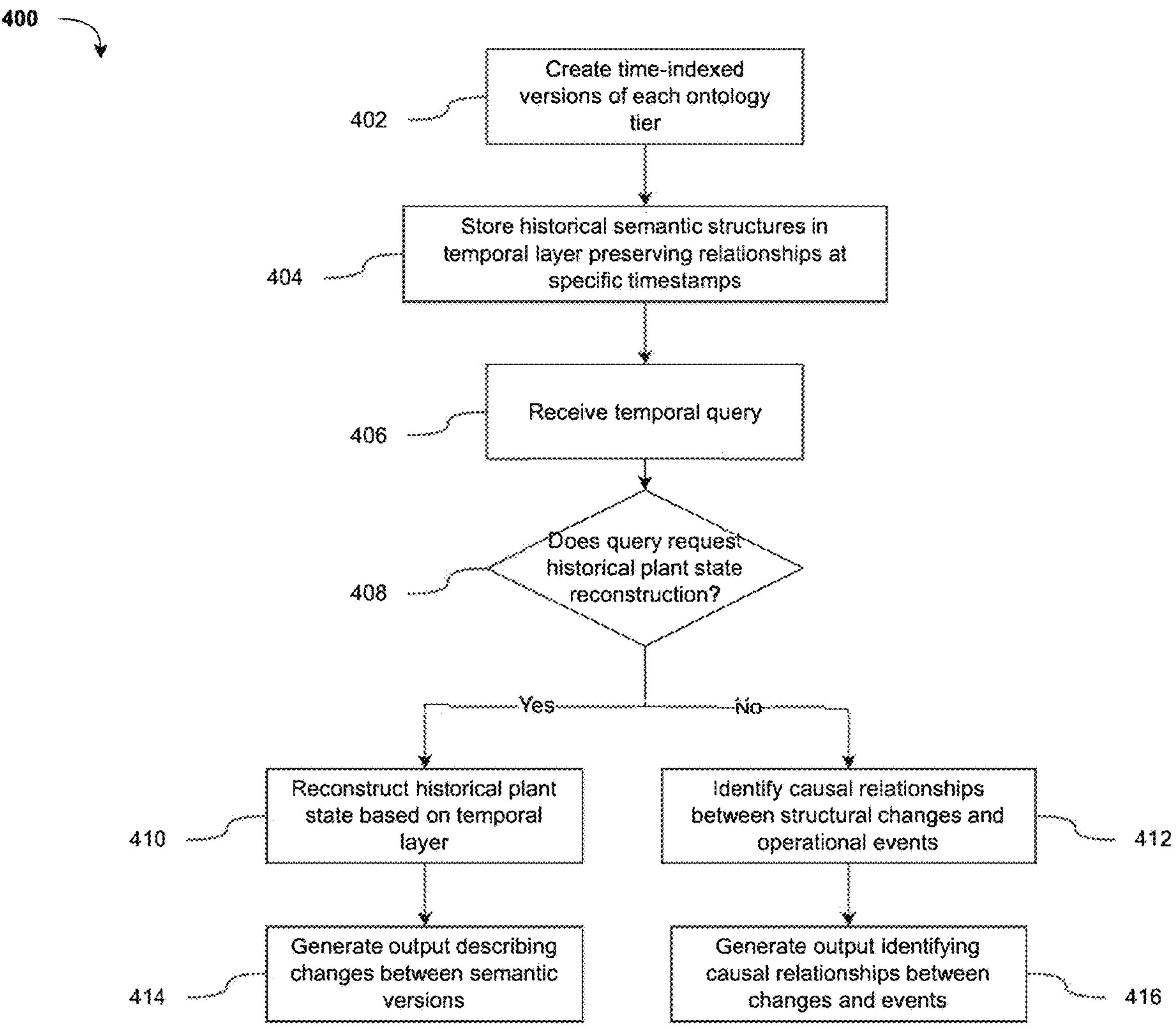
FIG. 4 illustrates a flowchart for a method for temporal ontology management and query processing, according to aspects of the present disclosure.

Referring to FIG. 4, a method 400 provides temporal ontology management and query processing capabilities that enable time-indexed reasoning and causal analysis within the hierarchical industrial knowledge ontology. The method 400 establishes temporal semantic layers that preserve historical configurations of equipment, functions, groups, and operating states, allowing reconstruction of prior plant states and supporting analysis of how structural or functional changes relate to operational events.

The method 400 begins with a step 402, where the system creates time-indexed versions of each ontology tier, including equipment components, equipment assets, connectivity, flow relationships, functional groups, and operating groups. The step 402 establishes temporal snapshots of the equipment components tier 102, equipment tier 112, equipment-to-equipment connectivity tier 120, flow tier 126, equipment-to-function tier 132, functional groups tier 136, and operating groups tier 142 at specific timestamps. In some cases, the step 402 creates time-indexed versions that capture not only the existence of ontological elements but also their attribute states and relationship configurations at each temporal snapshot.

The method 400 proceeds to a step 404, which involves storing historical semantic structures in a temporal layer that preserves relationships and groupings at specific timestamps. The step 404 maintains the semantic coherence of each temporal snapshot by preserving the graph structure and relational context that existed at each indexed time point. The temporal layer created in the step 404 stores historical versions of functional groups such as the cooling loop 138 and distillation circuit 140, along with their constituent equipment and flow relationships as they existed at specific timestamps. In some cases, the step 404 stores temporal versions of operating groups such as the safety envelope 144 and throughput optimization 146, capturing how operational objectives and their associated asset groupings evolved over time.

With continued reference to FIG. 4, the method 400 continues to a step 406, where the system receives a temporal query. The step 406 accepts queries that specify temporal parameters such as specific timestamps, time ranges, or comparative temporal contexts for analysis. The temporal query received in the step 406 specifies a timestamp for reconstructing the historical plant state at a specific point in time, enabling precise temporal targeting of ontological reconstruction operations.

The method 400 advances to a step 408, which presents a decision point asking whether the query requests historical plant state reconstruction. The step 408 evaluates the temporal query received in the step 406 to determine the appropriate processing path based on the query's analytical objectives. This decision point routes the query processing toward either state reconstruction or causal relationship identification based on the specific temporal analysis requirements.

If the query requests historical plant state reconstruction, the method 400 proceeds to a step 410, where the system reconstructs the historical plant state based on the temporal layer. The step 410 retrieves the time-indexed versions created in the step 402 and stored in the step 404 to rebuild the ontological structure as it existed at the specified timestamp. In some cases, reconstructing the historical plant state comprises retrieving equipment connectivity configurations that existed at the specified timestamp, enabling precise recreation of how equipment assets were connected and configured at prior time points. The step 410 reconstructs functional group configurations, operating group memberships, and flow relationships as they existed in historical temporal snapshots.

Following the step 410, the method 400 continues to a step 414, where the system generates output describing changes between semantic versions. The step 414 produces structured output that compares the reconstructed historical state with other temporal versions of the ontology. In some cases, generating the output comprises identifying changes in functional group membership between two temporal versions of the ontology, revealing how equipment associations with functional assemblies evolved over time.

If the query does not request historical plant state reconstruction, the method 400 moves to a step 412, where the system identifies causal relationships between structural changes and operational events. The step 412 analyzes temporal sequences to correlate modifications in equipment connectivity, functional groupings, or operating groups with subsequent operational outcomes. The causal relationships identified in the step 412 correlate connectivity changes with subsequent operational events including alarm conditions or performance deviations, enabling analysis of how structural modifications contributed to observed plant behavior.

After the step 412, the method 400 proceeds to a step 416, where the system generates output identifying causal relationships between changes and events. The step 416 produces analytical results that describe how temporal changes in the ontological structure preceded or contributed to operational events, supporting root cause analysis and predictive reasoning about the effects of plant modifications.

The temporal ontology management capabilities of the method 400 enable the industrial knowledge ontology 226 to serve as a comprehensive historical record that preserves not only data points but also the semantic relationships and structural configurations that characterized the plant at different time periods. This temporal semantic preservation supports advanced analytical capabilities that depend on understanding how plant configuration and operational context evolved over time, providing a foundation for causal analysis and state-dependent operational intelligence.

Figure 5:
FIG. 5 illustrates a flowchart for a method for hybrid ontology sustainment using machine learning, according to aspects of the present disclosure.
Figure 5:
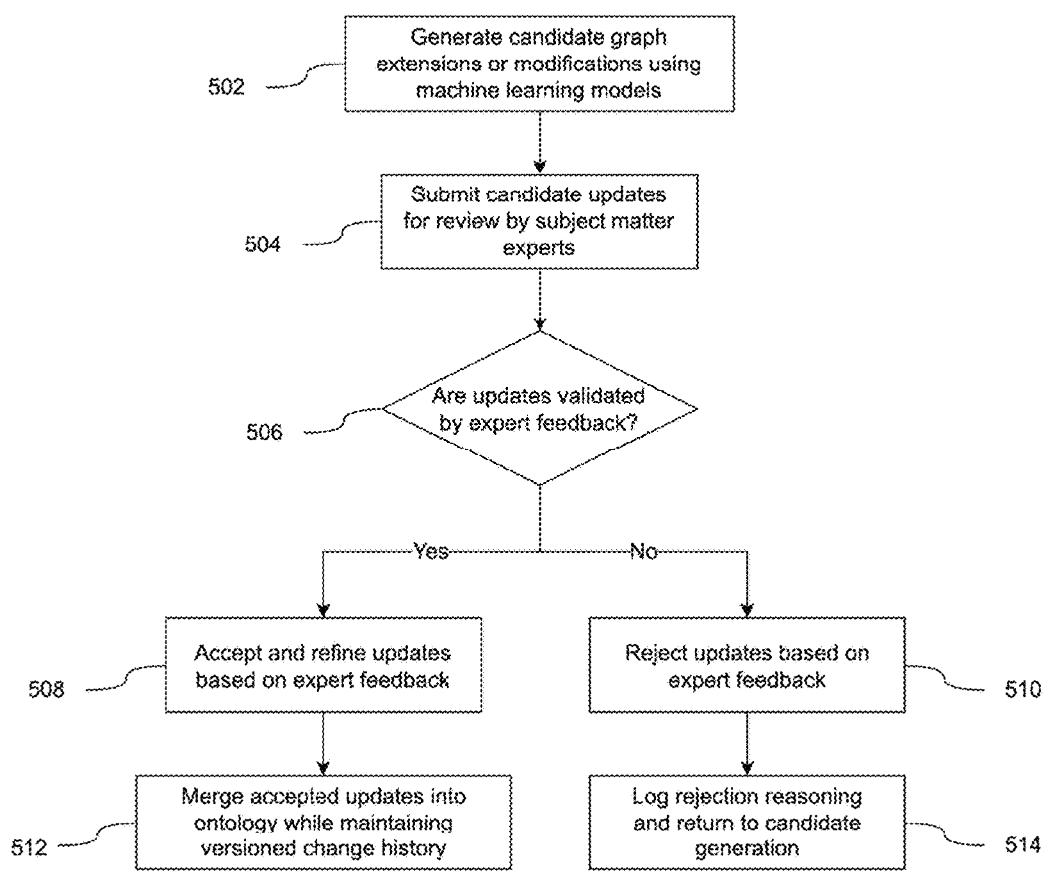

Referring to FIG. 5, a method 500 provides a hybrid ontology sustainment approach that combines automated machine learning analysis with expert validation to maintain semantic integrity of the hierarchical industrial knowledge ontology. The method 500 establishes a governed update process that leverages the computational capabilities of the machine learning models 202 while preserving accuracy through human oversight via the subject matter expert interface 210.

The method 500 begins with a step 502, where the system generates candidate graph extensions or modifications using machine learning models. The step 502 utilizes the candidate generator 204, pattern recognition 206, and data analysis engine 208 to analyze plant data and identify potential updates to the ontological structure. In some cases, the candidate graph extensions or modifications are generated based on analysis of the maintenance records 230, control system data 232, or process historian 234 information. The step 502 creates proposed modifications that include new equipment relationships, updated functional mappings, or revised operating group memberships based on patterns detected in the plant data sources.

The method 500 proceeds to a step 504, which involves submitting the candidate updates for review by one or more subject matter experts. The step 504 utilizes the review dashboard 212 within the subject matter expert interface 210 to present the candidate updates generated in the step 502 in an organized format for expert examination. The step 504 provides subject matter experts with access to the proposed modifications along with supporting data and analytical reasoning that led to their generation by the machine learning models.

With continued reference to FIG. 5, the method 500 continues to a step 506, which presents a decision point asking whether the updates are validated by expert feedback. The step 506 evaluates the expert review outcomes received through the expert feedback system 216 to determine the appropriate processing path for each candidate update. This decision point routes updates toward either acceptance and integration or rejection and documentation based on the validation results provided by the subject matter experts.

If the updates are validated by expert feedback, the method 500 proceeds to a step 508, where the system accepts and refines updates based on expert feedback. The step 508 incorporates any modifications or refinements suggested by the subject matter experts during their review process. The validation tools 214 support the step 508 by providing mechanisms for testing and verifying the refined updates before final acceptance. The step 508 ensures that expert insights and domain knowledge are incorporated into the candidate updates, enhancing their accuracy and alignment with operational realities.

Following the step 508, the method 500 continues to a step 512, where the system merges accepted updates into the ontology while maintaining versioned and traceable change history. The step 512 utilizes the update management system 218 to integrate the validated and refined updates into the industrial knowledge ontology 226. The version control 220 manages the versioning aspects of the step 512, while the change history tracker 222 records the traceable change history. In some cases, the versioned and traceable change history includes identifiers for responsible reviewers and reasoning for acceptance or rejection of updates, providing comprehensive documentation of the sustainment process.

If the updates are not validated by expert feedback, the method 500 moves to a step 510, where the system rejects updates based on expert feedback. The step 510 documents the rejection decision along with the reasoning provided by the subject matter experts through the expert feedback system 216. The step 510 preserves the expert rationale for rejecting proposed updates, creating a knowledge base that informs future candidate generation and improves the accuracy of subsequent machine learning analyses.

After the step 510, the method 500 proceeds to a step 514, where the system logs rejection reasoning and returns to candidate generation. The step 514 utilizes the change history tracker 222 to record the rejection reasoning and provides feedback to the machine learning models 202 to improve future candidate generation processes. The step 514 creates a closed-loop learning mechanism where rejected updates and their associated reasoning contribute to refinement of the machine learning algorithms, enhancing the quality of future candidate updates.

In some cases, the method 500 further comprises resolving conflicting ontology updates using a consensus or arbitration rule set when multiple subject matter experts provide differing feedback. This conflict resolution capability is implemented within the step 506 decision point or as an additional processing step that handles situations where expert opinions diverge regarding the validity or appropriateness of proposed updates.

The hybrid sustainment approach of the method 500 enables the industrial knowledge ontology 226 to evolve continuously while maintaining semantic correctness and operational relevance. The combination of automated candidate generation through machine learning and expert validation through human oversight provides scalable coverage across large facilities while preserving the accuracy and reliability needed for operational decision support applications.

Figure 6:
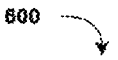
FIG. 6 illustrates a flowchart for a method for ontology traversal and semantic query processing, according to aspects of the present disclosure.
Figure 6:
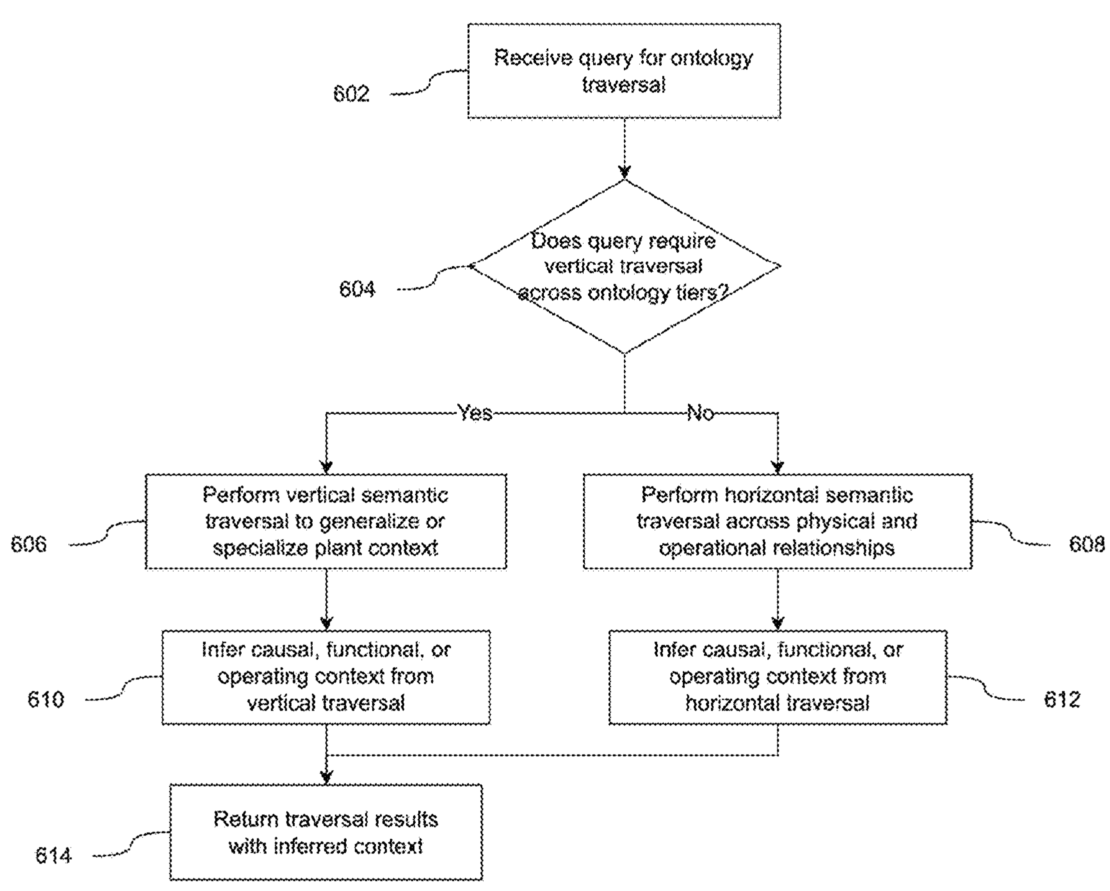

Referring to FIG. 6, a method 600 provides ontology traversal and semantic query processing capabilities that enable bidirectional navigation through the hierarchical industrial knowledge ontology. The method 600 supports both vertical movement across abstraction levels and horizontal movement across different relationship types within the multi-tier graph structure, enabling comprehensive semantic analysis and context-aware reasoning.

The method 600 begins with a step 602, where the system receives a query for ontology traversal. The step 602 accepts queries that specify traversal parameters, target elements, or analytical objectives that require navigation through the semantic layers of the hierarchical industrial ontology system 100. The query received in the step 602 requests information that spans multiple tiers of the ontological structure, requiring coordinated traversal across the equipment components tier 102, equipment tier 112, equipment-to-equipment connectivity tier 120, flow tier 126, equipment-to-function tier 132, functional groups tier 136, or operating groups tier 142.

The method 600 proceeds to a step 604, which presents a decision point asking whether the query requires vertical traversal across ontology tiers. The step 604 evaluates the query received in the step 602 to determine the appropriate traversal strategy based on the semantic navigation requirements. This decision point routes the query processing toward either vertical movement across abstraction levels or horizontal movement across relationship types based on the specific analytical objectives of the traversal request.

If the query requires vertical traversal across ontology tiers, the method 600 proceeds to a step 606, where the system performs vertical semantic traversal to generalize or specialize plant context. The step 606 enables movement upward from specific components or equipment to higher-level functional or operational contexts, or downward from high-level groups to constituent assets and relationships. In some cases, the step 606 generalizes from individual equipment instances in the equipment tier 112 to their associated functional groups in the functional groups tier 136, or specializes from operating groups in the operating groups tier 142 to the specific equipment and flow relationships that contribute to operational objectives.

With continued reference to FIG. 6, if the query does not require vertical traversal across ontology tiers, the method 600 moves to a step 608, where the system performs horizontal semantic traversal across physical and operational relationships. The step 608 enables navigation across different categories of relationships within the same abstraction level, such as following flow paths through the flow tier 126 to identify affected equipment, or expanding from equipment-to-function mappings in the equipment-to-function tier 132 to related functional assemblies. The step 608 supports traversal across physical connections 122 and mechanical links 124 within the equipment-to-equipment connectivity tier 120, or navigates between process flows 128 and utility flows 130 within the flow tier 126.

Following the step 606, the method 600 continues to a step 610, where the system infers causal, functional, or operating context from vertical traversal. The step 610 analyzes the results of vertical semantic navigation to derive contextual insights that span multiple abstraction levels. The step 610 infers how component-level conditions in the equipment components tier 102 relate to functional performance in the functional groups tier 136, or determines how operational objectives in the operating groups tier 142 depend on specific equipment configurations in the equipment tier 112.

After the step 608, the method 600 proceeds to a step 612, where the system infers causal, functional, or operating context from horizontal traversal. The step 612 analyzes the results of horizontal semantic navigation to derive contextual insights that span different relationship types within similar abstraction levels. The step 612 infers how connectivity patterns in the equipment-to-equipment connectivity tier 120 affect flow behaviors in the flow tier 126, or determines how functional mappings in the equipment-to-function tier 132 relate to operational groupings that share similar objectives.

As further shown in FIG. 6, both processing paths converge at a step 614, where the system returns traversal results with inferred context. The step 614 provides structured output that combines the navigation results from either the step 606 or the step 608 with the contextual inferences generated in the step 610 or the step 612. The step 614 returns comprehensive semantic analysis that integrates multiple layers of plant understanding, enabling complex operational queries that span physical connectivity, functional behavior, and operational objectives within a unified analytical framework.

The bidirectional semantic traversal capabilities of the method 600 enable the industrial knowledge ontology 226 to support procedural guidance for startup, shutdown, or abnormal operation scenarios. The traversal operations identify equipment sequences, dependency relationships, and operational constraints that inform procedural steps across different operating modes. In some cases, the method 600 traverses from operational objectives in the operating groups tier 142 down through functional assemblies in the functional groups tier 136 to specific equipment actions in the equipment tier 112, providing comprehensive procedural context that spans multiple abstraction levels.

The semantic query processing capabilities of the method 600 enable the industrial knowledge ontology 226 to support simulation of hypothetical plant configuration changes. The traversal operations analyze the potential impacts of proposed modifications by navigating through affected relationships and dependencies across the multi-tier ontological structure. The method 600 simulates how changes to equipment connectivity in the equipment-to-equipment connectivity tier 120 would affect flow patterns in the flow tier 126, functional performance in the functional groups tier 136, and operational objectives in the operating groups tier 142, providing comprehensive impact analysis for proposed plant modifications.

In an illustrative example of the complete system operation, consider a scenario where a refinery's cooling water system experiences recurring performance issues. The machine learning models 202 analyze maintenance records 230 showing that Pump-101 and Heat Exchanger-205 are frequently serviced together, and control system data 232 reveals correlated flow rate deviations. The candidate generator 204 proposes adding a functional group relationship linking these assets within a "Cooling Loop A" functional group. This candidate is presented through the review dashboard 212 to a process engineer, who validates the relationship and adds two additional assets (Valve-301 and Flow Meter-402) based on operational knowledge. The update management system 218 merges this validated functional group into the industrial knowledge ontology 226, creating new edges in the functional groups tier 136. Subsequently, when an operator queries the system about equipment affected by Pump-101 degradation, the traversal method 600 performs vertical traversal from the equipment tier 112 to the functional groups tier 136, identifying all members of Cooling Loop A, then performs horizontal traversal through the flow tier 126 to identify downstream equipment that would be affected by reduced cooling capacity. The system returns this comprehensive context to an AI-assisted decision support application, which generates procedural guidance for managing the degraded condition.

In some cases, traversal results from the step 614 are provided as structured context to artificial intelligence, large language models, or planning agents that require comprehensive plant understanding for decision support applications. The method 600 generates causal reasoning chains describing inferred equipment or operating impacts, enabling AI-assisted systems to perform complex operational analysis that integrates multiple semantic layers of the hierarchical industrial knowledge ontology.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method for constructing and maintaining a hierarchical industrial knowledge ontology that unifies physical structure and operational behavior of an industrial facility, the method comprising:

generating a multi-tier graph data model representing the industrial facility, the model comprising:

a physical structure layer defining nodes and relationships corresponding to physical assets and their fixed connectivity;

a functional abstraction layer defining nodes and relationships that decouple physical assets from their functional characteristics and process-driven groupings; and an operational intent layer defining nodes and relationships corresponding to outcome-driven subgraphs associated with specific operational objectives or modes;

maintaining a temporal layer on the graph data model, the temporal layer being configured to preserve a historical version of the semantic relationships and connectivity within each layer, thereby enabling the reconstruction of past plant configurations at a specified timestamp for causal analysis; and implementing a hybrid ontology sustainment mechanism to govern modifications to the graph data model, the mechanism comprising the steps of:

generating candidate updates to the graph using a machine learning model analyzing real-time plant data;

submitting the candidate updates for review and validation by one or more subject matter experts via a review dashboard that presents the candidate updates in an organized format within the context of existing ontological structures across the multiple tiers of the graph data model, along with supporting evidence from the plant data; and merging validated updates into the graph data model only after approval and automatically logging the change event in the temporal layer.

2. The method of claim 1, wherein the flow tier defines directional transfer relationships that specify directionality of material, energy, or signal transfer between equipment nodes in the multi-tier graph data model.

3. The method of claim 2, wherein generating the flow tier comprises distinguishing process flows from utility flows within the directional transfer relationships.

4. The method of claim 2, wherein flow relationships are defined between equipment nodes and component nodes to represent flow paths internal to multi-part equipment assemblies.

5. The method of claim 1, wherein generating the equipment components tier comprises defining nodes for impellers, bearings, seals, casings, motor windings, and valve internals as granular physical elements.

6. The method of claim 1, wherein generating the functional groups tier comprises creating nested functional subgraphs representing cooling loops, distillation circuits, or reflux systems.

7. The method of claim 1, wherein the functional groups tier assigns functional characteristics to both equipment nodes and equipment-component nodes to represent internal functional roles within an asset.

8. The method of claim 1, wherein generating the operating groups tier comprises defining outcome-driven subgraphs representing operational objectives including throughput maximization, safety envelope maintenance, or energy efficiency optimization.

9. The method of claim 1, wherein operating groups include static groups defined by sustained operational objectives and transient groups instantiated or deactivated based on detected operational conditions.

10. The method of claim 1, further comprising applying ontology integrity rules that restrict modifications to the multi-tier graph data model that would violate physical or operational constraints.

11. The method of claim 10, further comprising performing dependency revalidation when a graph update affects related equipment, flow, or function nodes in the multi-tier graph data model.

12. The method of claim 1, wherein generating the functional groups tier comprises creating nested functional groups representing hierarchical unit operations within the multi-tier graph data model.

13. The method of claim 1, wherein generating the equipment-to-equipment connectivity tier comprises deriving static physical connectivity relationships at least in part from piping and instrumentation diagrams.

14. The method of claim 1, wherein the multi-tier graph data model is stored using distributed graph database implementations that enable scale-out compute operations for traversal and reasoning across the hierarchical ontological structure.

15. The method of claim 1, wherein generating the multi-tier graph data model further comprises defining additional tiers including equipment components, equipment-to-equipment connectivity, flow semantics, equipment-to-function mappings, nested functional groups, and operating groups.

16. The method of claim 1, wherein maintaining the temporal layer further comprises generating semantic differences between historical and current versions and enabling temporal traversal to reconstruct causal sequences across time-indexed configurations.

17. The method of claim 1, further comprising storing governance metadata including trust weights, source lineage, reviewer annotations, or conflict-resolution outcomes and applying the governance metadata during ontology modification or traversal.

18. The method of claim 1, further comprising generating user-defined semantic groupings by receiving a user specification of a grouping of equipment, functions, or flows, validating the grouping using ontology integrity rules, and incorporating the grouping into the multi-tier graph data model.

19. A computer-implemented system for constructing and maintaining a hierarchical industrial knowledge ontology that unifies physical structure and operational behavior of an industrial facility, the system comprising:

one or more processors configured to generate a multi-tier graph data model representing the industrial facility, the model comprising:

a physical structure layer defining nodes and relationships corresponding to physical assets and their fixed connectivity;

a functional abstraction layer defining nodes and relationships that decouple physical assets from their functional characteristics and process-driven groupings; and an operational intent layer defining nodes and relationships corresponding to outcome-driven subgraphs associated with specific operational objectives or modes;

a temporal layer configured to preserve a historical version of the semantic relationships and connectivity within each layer, thereby enabling the reconstruction of past plant configurations at a specified timestamp for causal analysis; and a hybrid ontology sustainment mechanism configured to govern modifications to the graph data model, the mechanism comprising:

a machine learning subsystem configured to analyze plant data and generate candidate modifications to the graph data model;

a validation interface comprising a review dashboard configured to present the candidate modifications in an organized format within the context of existing ontological structures across the multiple tiers of the graph data model, along with supporting evidence from the plant data, to one or more subject matter experts for review;

an update management subsystem configured to integrate validated modifications into the graph data model while maintaining version control.

20. The system of claim 19, wherein the update management subsystem maintains versioned and traceable change history that includes identifiers for responsible reviewers and reasoning for acceptance or rejection of updates.

21. The system of claim 20, wherein the validation interface further comprises a conflict resolution module configured to resolve conflicting ontology updates using a consensus or arbitration rule set when multiple subject matter experts provide differing feedback.

22. The system of claim 19, wherein the functional abstraction layer comprises a functional groups tier configured to create nested functional subgraphs representing cooling loops, distillation circuits, or reflux systems, and wherein the functional abstraction layer assigns functional roles to component-level nodes to reflect internal functional behavior of multi-part equipment assemblies.

23. A computer-implemented method for traversing a hierarchical industrial knowledge ontology, comprising:

receiving a query for ontology traversal;

performing semantic traversal through a multi-tier graph data model representing an industrial facility, wherein the semantic traversal comprises at least one of:

vertical traversal across different abstraction levels of the ontology to generalize or specialize plant context; or horizontal traversal across different relationship types within the ontology to navigate physical and operational relationships;

generating output comprising inferred causal, functional, or operating context based on the semantic traversal;

further comprising performing temporal traversal through time-indexed versions of the multi-tier graph data model to identify semantic changes or reconstruct causal sequences preceding an operational event; and wherein the semantic traversal is prioritized or filtered based on governance metadata including trust levels, reviewer confidence, or historical validation patterns.

24. The method of claim 23, wherein vertical traversal comprises moving from specific equipment components to higher-level functional groups or operating groups.

25. The method of claim 23, wherein horizontal traversal comprises following flow paths to identify affected equipment.

26. The method of claim 23, wherein the output is provided as structured context to an artificial intelligence system, large language model, or planning agent.

27. The method of claim 23, further comprising generating causal reasoning chains describing inferred equipment or operating impacts.

28. The method of claim 23, wherein traversal incorporates user-defined semantic groupings to constrain or contextualize traversal paths.

* * * * *